Sept. 15, 1959     B. I. ULINSKI     2,903,977
TRAILER SPOTTING APPARATUS AND TRACTOR
Filed Nov. 9, 1953     4 Sheets-Sheet 1

INVENTOR
*B. I. Ulinski*
BY *A. H. Golden*
ATTORNEY

Sept. 15, 1959   B. I. ULINSKI   2,903,977
TRAILER SPOTTING APPARATUS AND TRACTOR
Filed Nov. 9, 1953   4 Sheets-Sheet 2
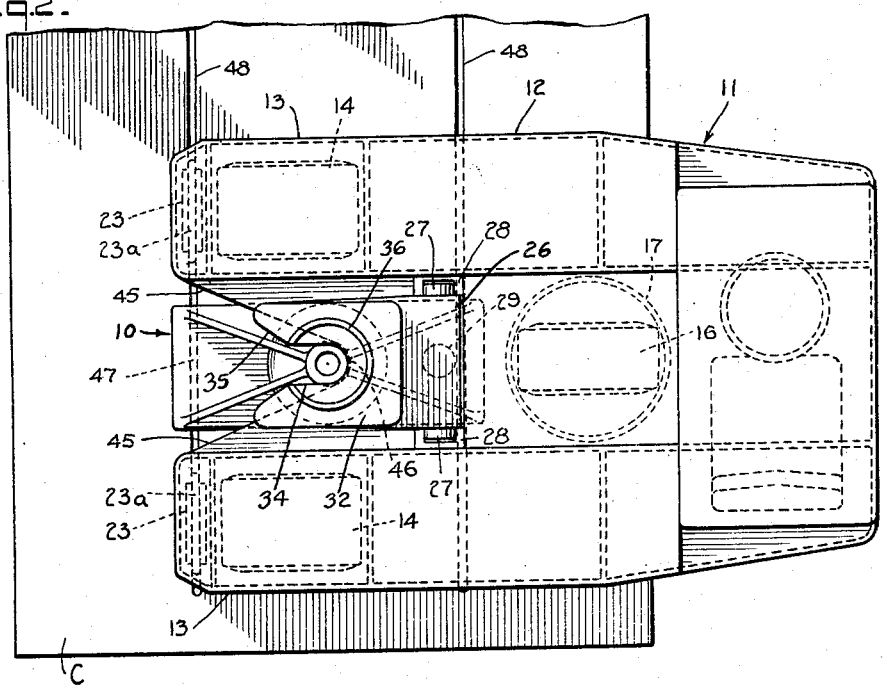
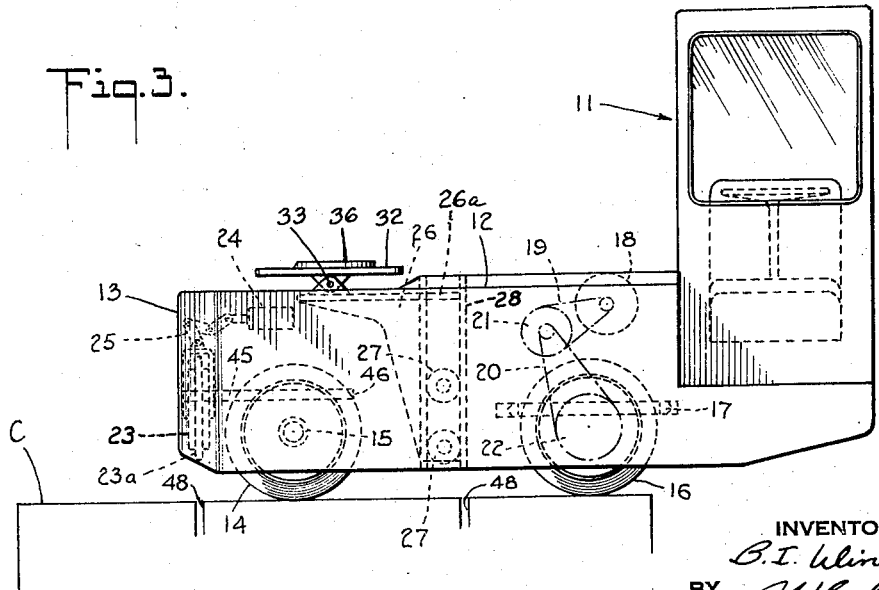
INVENTOR
B. I. Ulinski
BY A. H. Golden
ATTORNEY Sept. 15, 1959 B. I. ULINSKI 2,903,977
TRAILER SPOTTING APPARATUS AND TRACTOR
Filed Nov. 9, 1953 4 Sheets-Sheet 3

INVENTOR
B. I. Ulinski
BY A. H. Golden
ATTORNEY

Sept. 15, 1959 B. I. ULINSKI 2,903,977
TRAILER SPOTTING APPARATUS AND TRACTOR
Filed Nov. 9, 1953 4 Sheets-Sheet 4

INVENTOR
B. I. Ulinski
BY
ATTORNEY

2,903,977

TRAILER SPOTTING APPARATUS AND TRACTOR

Bronislaus I. Ulinski, Chicago, Ill., assignor to The Yale & Towne Manufacturing Company, Stamford, Conn., a corporation of Connecticut Application November 9, 1953, Serial No. 390,885

12 Claims. (Cl. 105—368)

This invention relates to a trailer spotting apparatus for use in manipulating and securing road trailers on railroad cars.

Those skilled in the art are fully aware of the many developments that have been made in an attempt to facilitate the placing of road trailers on railroad cars such as flat cars. The purpose generally is to utilize the road trailer at the beginning of a long journey, at which time the trailer is moved about by a tractor and is loaded. It is then placed upon the railroad car and is transported without its tractor for the greater part of its journey. Then it is removed from the railroad car, hitched to a tractor and taken to its unloading point.

Because the railroad cars used for the purpose are generally flat cars of standard width, it is naturally extremely difficult to manipulate a large trailer into position on the flat car for transport thereby. It is the purpose of my invention to contribute a novel type of tractor that is well adapted to manipulate a trailer relatively to a flat car, and also to function in securing the trailer in proper position on the flat car so that it may travel with safety on the flat car.

As a particular feature of my invention I use a tractor that normally moves about on usual traction and trailing wheels. The tractor is equipped with a special pair of guide wheels adapted to move into guided relation to the flat car so that the tractor may at any time it is desired, move in fixed relation to the flat car so as to move the trailer in a particular guided path.

As a more particular feature of the invention, the tractor is equipped with a pair of wheels adapted to move upwardly and downwardly, the wheels when moved downwardly supporting the tractor thereafter with certain of the standard wheels of the tractor off the ground. The wheels that are so moved downwardly are guide wheels and coact with means on the flat car that may be slots or tracks. Preferably the traction wheel of the tractor may be moved into alignment with the guide wheels so as to move the tractor in the direction in which the guide wheels hold the tractor for movement.

As a still further feature of the invention my tractor is equipped with means for coacting with the standard coupling pin of road trailers so as to deposit the pin in assembled relation to a holding pedestal or stand. It is the feature of this part of the invention that the means for moving the trailer through the coupling pin permit the deposit of the coupling pin and the removal of the tractor portion that supports the trailer coupling pin during its manipulation toward and onto the pedestal. Similarly, the particular parts described facilitate the removal of the trailer coupling pin from the pedestal when the trailer is to be taken off the flat car. It should be particularly emphasized at this point that because of the construction referred to, it is possible to utilize the trailer coupling pin in its standard present form and without interference with the coaction of this trailer coupling pin and the standard road tractor.

As a more particular part of this invention, the tractor that I utilize for manipulating the trailer is adapted to coact with an adapter extending between the trailer coupling pin and a pedestal opening, this adapter effecting a space for the insertion and removal of the tractor part that is adapted to lift and manipulate the trailer.

As another feature of my invention, I cause the pedestal and the trailer to be automatically positioned relatively to one another on the flat car to enable the pedestal to support the trailer in loaded position on the car. This I accomplish by moving the trailer to place its coupling means in alignment with the pedestal before the trailer reaches its final loaded position on the car. I then move the pedestal to maintain it in vertically aligned relation to the coupling means during the further movement of the trailer. Once the trailer is in loaded position relatively to the car, therefore, it is merely necessary to lower the trailer onto the pedestal without further manipulation of the pedestal or trailer.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 2 is a plan view showing my novel tractor positioned relatively to the pedestal on the flat car.

Fig. 3 is a side view showing the tractor.

Figure 1:
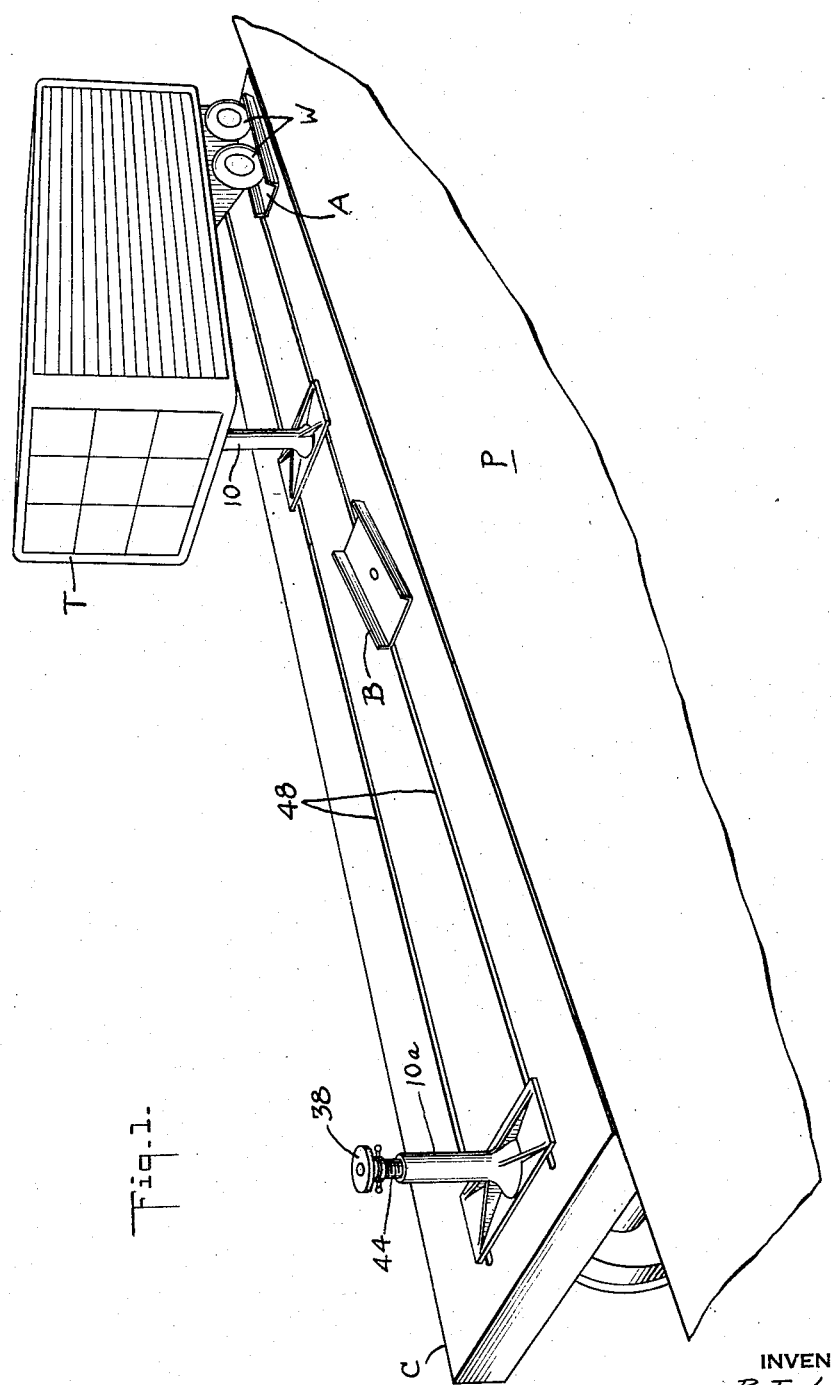
Fig. 1 is a view showing the flat car that I utilize in my invention, with a highway trailer loaded thereon.

Referring now more particularly to Fig. 1, I show a flat car C in position opposite a loading platform P with a trailer T in loaded position on the car. The trailer T is of a usual type having rear wheels W, and adapted to be moved and steered on these wheels by a tractor supporting the front end of the trailer. When the trailer T is loaded on the car in position to be transported by rail, a pedestal 10 supports the front end of the trailer. Preferably the flat car C is equipped with a turntable A upon which the wheels W at one side of the trailer T rest, the purpose of this turntable being to enable the trailer to turn into the proper loaded position on the car without causing excessive shearing stresses on the wheels. I show the car C equipped also with a second turntable B and pedestal 10a for a second trailer.

Those skilled in the art will understand that a conventional highway tractor can move a trailer of the type shown onto the car C from the platform P, but cannot readily place the trailer in a precise position on the car. This is because the tractor will be at an angle to the car when the trailer is aligned relatively to the car, and the highway tractor can not then move the trailer along the car. The trailer must, of course, be positioned not only in the longitudinal axis of the car, but must also be positioned accurately in a longitudinal direction in order to utilize efficiently the space on the car. Further, the front end of the trailer and the pedestal 10 must be in a particular position relatively to one another to enable the trailer to be deposited on the pedestal. Naturally, the surface of the car provides but little room in which to maneuver the tractor. It is extremely difficult, therefore, when using the ordinary highway tractor, to place the trailer precisely in the required position on the car, or to place it in this position without undue loss of time.

Figure 4:
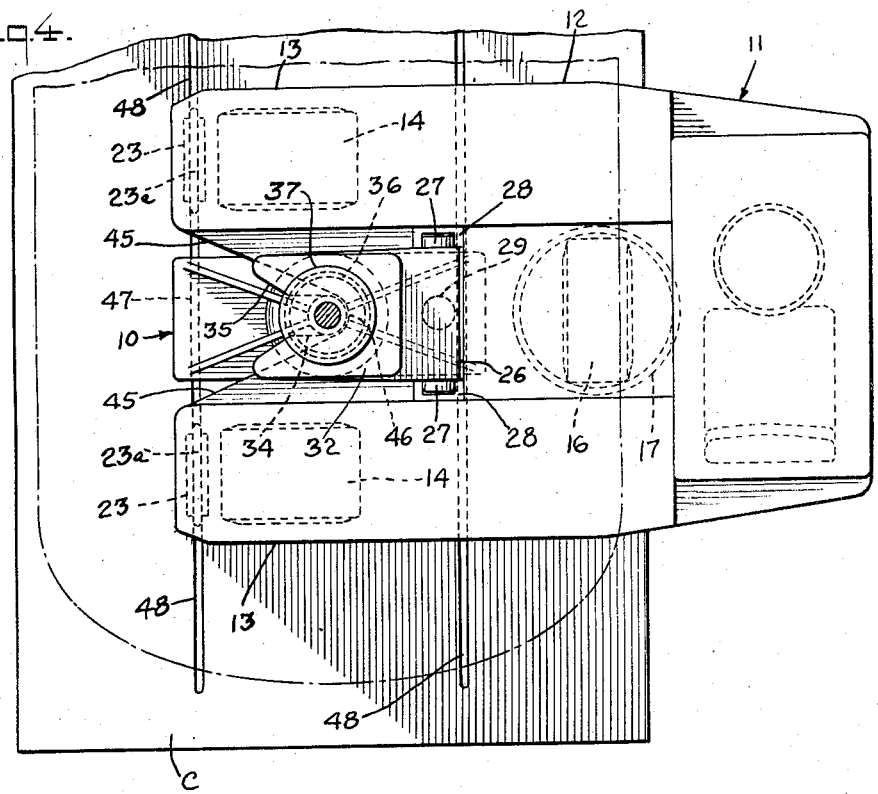
Fig. 4 is similar to Fig. 2 but shows further the adapter through which the tractor supports the trailer.
Figure 5:
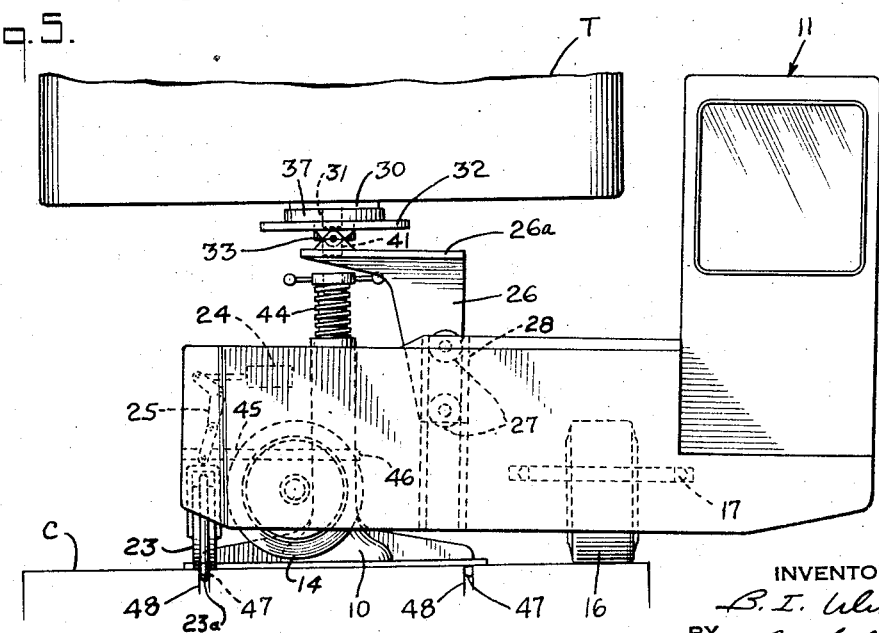
Fig. 5 is an elevation of the parts of Fig. 4.

I show in Figs. 2, 3, 4, and 5, the novel tractor 11 that I utilize to manipulate the trailer T very efficiently relatively to the flat car C and to move the trailer quickly to a precise position on the car. The tractor 11 has a main frame 12 that is substantially U-shaped in form, with rearwardly extending side portions 13. Upon these side portions 13 are a pair of standard trailing wheels 14 mounted on axles 15 that are fixed to the frame in positions extending transversely to the tractor. Supporting the forward portion of the tractor 11 is a steering and traction wheel 16 mounted through a turntable 17 for steering movement, with the turntable enabling the wheel 16 to be steered either in a general forward and rearward direction, as in Figs. 2 and 3, or at right angles to the longitudinal truck axis, as shown in Figs. 4 and 5. The tractor does, of course, have suitable drive means for imparting tractive effort to the traction wheel 16 in all its steered positions, and merely by way of example I show for this purpose a motor 18 acting through chains 19, 20 and sprocket wheels 21, 22. The drive means and traction wheel 16 rotate together, as is common in this art, and are known as the traction unit.

On the side portions 13 of the tractor 11, Figs. 2, 3, 4, and 5, I mount guide wheels 23 in positions juxtaposed to the trailing wheels 14. These guide wheels 23 rotate on axes that are fixed at right angles to the axes on which the trailing wheels 14 rotate, but can move vertically relatively to the wheels 14. To effect this vertical movement, I show a pair of hydraulic rams 24 adapted to act on the guide wheels through links 25.

Through this arrangement, it is possible to move the tractor 11 in the usual way upon the trailing wheels 14, with the tractor steered and driven by the wheel 16. By actuating the rams 24 to move the guide wheels 23 downwardly to the positions shown in Fig. 5, the wheels 14 will be raised from the ground and the rear end of the tractor will be supported instead on wheels 23. The steering and traction wheel 16 can then be positioned at right angles to the tractor axis, as shown in Figs. 4 and 5, to drive the tractor in a direction at right angles to its former movement. I show the guide wheels 23 formed with flanges 23a to control more positively the direction in which the tractor moves when supported on the guide wheels, and I shall describe the action of these flanges more particularly in due course.

As means for lifting and supporting the front end of the trailer T on the tractor 11, I show in Figs. 2 to 5 a lifting carriage 26 positioned between the side portions 13 of the tractor, with rollers 27 mounting the carriage 26 on channels 28 for vertical movement relatively to the tractor. To effect the vertical movement of the carriage 26, I prefer to utilize a hydraulic ram 29. The mounting of carriage 26 and its actuation by ram 29 is entirely conventional.

Figure 6:
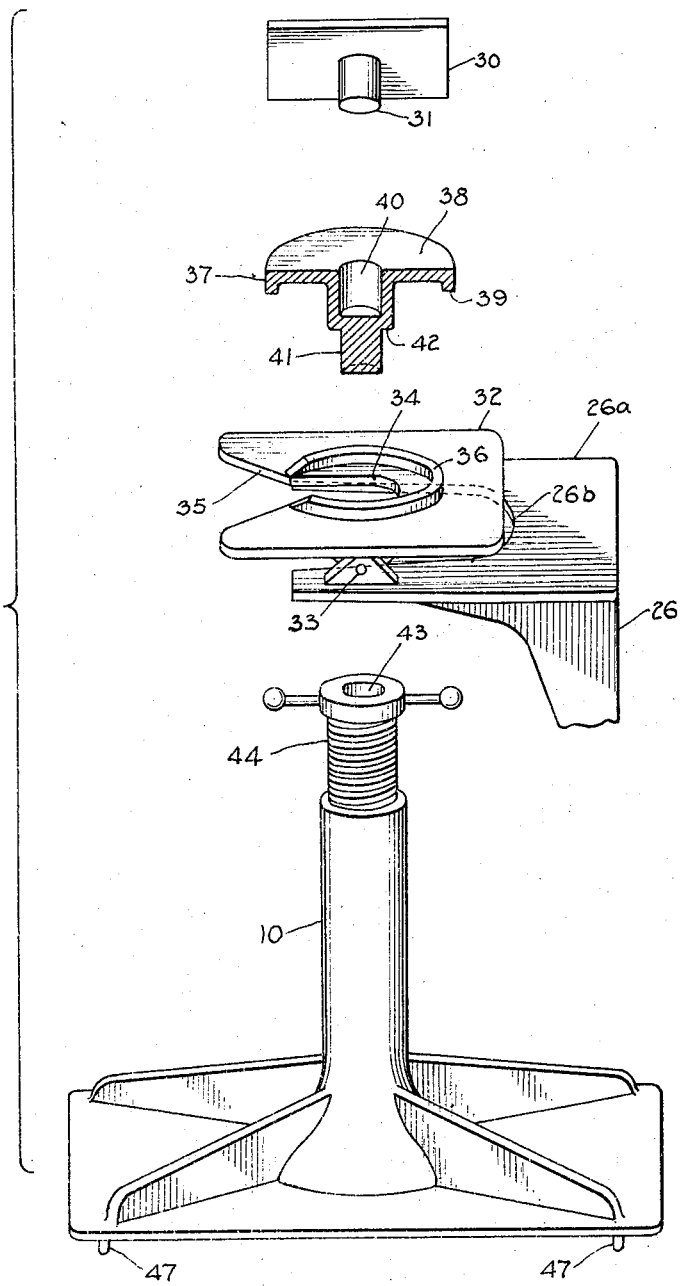
Fig. 6 is an exploded view illustrating the pedestal, the lifting member of the tractor, the adapter, and the trailer coupling pin.

When supporting the front end of the trailer T, the lifting carriage 26 acts through the support plate 30 and vertical coupling pin 31, best seen in Figs. 5 and 6, with which trailers of this class are ordinarily equipped. It is through this same support plate 30 and coupling pin 31 that the pedestal 10 acts when supporting the trailer T on the flat car C. Obviously, the lifting carriage 26 and pedestal 10 must not interfere with one another when the carriage 26 deposits the plate 30 and pin 31 relatively to the pedestal 10, and the carriage 26 must thereafter be free to move on the tractor 11 away from the trailer T. I shall now describe the novel arrangement whereby I enable the lifting carriage 26 to deposit the support plate 30 and coupling pin 31 in assembled relation to the pedestal 10, and also to move away from the pedestal, without interference between the carriage and pedestal.

The upper part of the lifting carriage 26 has a forwardly extending portion 26a, best seen in Fig. 6, upon which I mount a lifting member 32 through horizontal pivots 33. The lifting member 32 has a generally flat plate-like form, with a large central opening 34. The forward edge portion of the member 32 is slotted to form a tapered entrance throat 35 for the central opening 34. It may be noted here that the lifting carriage 26 has in its forward edge a relatively large slot 26b so formed that the carriage does not in any way obstruct the opening 34 and slot 35 in the lifting member 32. A circular flange 36 is formed integrally on the upper surface of the lifting member 32 and extends around the central opening 34 at some distance outwardly from the opening, but this flange does not extend across the entrance throat 35.

I provide an adapter 37, best seen in Fig. 6, through which the lifting member 32 coacts with the support plate 30 and coupling pin 31 on the trailer T. The adapter 37 has a flat upper portion 38, and on the lower side of this portion 38 is a flange 39 adapted to encircle the flange 36 on the lifting member 32, with one or both of these flanges supporting the adapter relatively to the lifting member 32. A vertical bore 40 is formed in the adapter 37 to receive the trailer coupling pin 31 when the upper portion 38 of the adapter is against the trailer support plate 30, in the position shown in Fig. 5. Because of the coaction between the coupling pin 31 and the bore 40, and also the coaction between the circular flanges 36 and 39, the adapter 37 is effective to hold the trailer coupling pin 31 against lateral movement relatively to the lifting member 32.

On the lower side of the adapter 37, and aligned axially with the adapter bore 40, I form a pin 41, Fig. 6, with a transverse bearing surface 42 on the adapter extending around this pin. The pin 41 is so formed that it may fit into a bore 43 in the upper end of the pedestal 10, with the pedestal then supporting the adapter 37 through the bearing surface 42. As actually shown, the pedestal 10 has an upper screw portion 44 in which the bore 43 is formed, but this arrangement is merely for the purpose of adjusting the height of the pedestal and is not essential to an understanding of my invention.

It is important to observe at this point that when the adapter 37 is supported by the pedestal 10 as just described, there is sufficient space between the adapter and the pedestal for movement of the lifting member into and out of lifting relation to the adapter. If the adapter were not used, the lifting member 32 could not deposit coupling pin 31 into opening 43 and withdrawn. Reversely, with pin 31 in opening 43 of the pedestal, the member 32 could not enter under support plate 30 to lift the pin 31 out of the pedestal opening. This concept of adapter 37 and its functioning between the trailer, the tractor, and the pedestal is of extreme importance as it makes it possible to utilize my invention in combination with a standard trailer.

I shall now proceed to a particular description of the manner in which the pedestal 10 and the front end of the trailer T are automatically placed in vertical alignment with one another in the loaded position of the trailer. Of course, with the front end of the trailer T supported through the adapter 37, as in Figs. 4 and 5, it is actually the adapter with which the pedestal 10 is aligned. It will be understood that the tractor 11, when moving the trailer T into alignment with the car C, is first positioned transversely to the flat car C as indicated in Fig. 4, the rear trailer wheels W being in the position shown in Fig. 1, having been moved previously onto the car. The aligning movement of the tractor 11 is in the longitudinal tractor axis, with the tractor supported on the trailing wheels 14 and steering and traction wheel 16, as shown in Figs. 2 and 3. During this movement, the precise position of the tractor 11 and trailer T relatively to the length of the car C is not important. In fact, it is a feature of my invention that the tractor 11 need not be exactly aligned with the pedestal 10 as it approaches the pedestal, and it is merely necessary that the tractor 11 be so aligned that the pedestal 10 will enter at some point between the tractor side portions 13.

I provide upon the tractor 11 cam surfaces 45, Figs. 2 and 4, that are inclined inwardly from the outer ends of the tractor side portions 13, and extend to a stop surface 46 positioned in the tractor axis vertically below the lifting member 32. Obviously, one or the other of the cam surfaces 45 will engage the pedestal 10 if the tractor 11 approaches the pedestal when the pedestal is not exactly in the tractor axis. In addition, I mount the pedestal 10 on the flat car C for movement in the longitudinal car axis. I show for this purpose lugs 47 on the pedestal base, Figs. 5 and 6, these lugs sliding relatively to tracks or slots 48 extending longitudinally on the car C. Therefore, when the tractor 11 moves transversely to the car C to align the trailer T with the car, the tractor acts through one of its cam surfaces 45 to shift the pedestal 10 toward the stop surface 46 in the axis of the tractor. The stop surface 46 is so formed that, when it is engaged by the pedestal 10, the adapter 37 on the lifting member 32 is positioned in vertical alignment with the opening 43 of pedestal 10. Further, the pedestal 10 by engagement with the stop surface 46 limits the movement of the tractor 11 transversely of the flat car to a position in which the coupling pin 31 of the trailer T is aligned longitudinally with the car C.

I shall now call attention to the fact that the guide wheels 23 occupy a particular position on the tractor 11 relatively to the stop surface 46. I so mount the guide wheels 23 that these wheels are directly over one of the tracks or slots 48 on the car C, as in Figs. 2 and 3, when the stop surface 46 is juxtaposed to the pedestal 10. Therefore, if the rams 24 are actuated to move the guide wheels 23 downwardly while the lifting member 32 supports the adapter 37 in alignment with the pedestal 10, as shown in Figs. 4 and 5, the flanges 23a on the guide wheels will enter the particular slot 48. The downward movement of the guide wheels 23 will also lift the trailing wheels 14 from the surface of the car C.

If the traction and steering wheel 16 is now steered at right angles to its former direction, the guide wheels 23 will hold the tractor 11 precisely in the longitudinal axis of the flat car C as the wheels 16 drives the tractor. The tractor 11 thereby moves the adapter 37 and the trailer T longitudinally to loaded position on the car and, furthermore, the tractor during this movement acts through one of the cam surfaces 45 to move the pedestal 10 and to maintain the pedestal vertically aligned relatively to the adapter 37. Therefore, the pedestal 10 is automatically in position to support the trailer T when the trailer reaches loaded position on the flat car C, and, to deposit the trailer upon the pedestal, it is merely necessary to lower the lifting carriage 26, with the adapter pin 41 then entering the pedestal bore 43.

It will be recalled that the pedestal 10 supports the adapter 37 through a bearing surface 42 that is spaced from the surfaces through which the lifting member 32 supports the adapter. Because the pedestal 10 and lifting member 32 in this arrangement do not interfere with one another, it is possible to release the truck from the trailer T merely through the downward movement of the lifting member 32 when depositing the trailer T on the pedestal 10. This downward release movement effects movement of the lifting member flange 36 away from the adapter flange 39, and the slot 35 in the lifting member then allows the lifting member to move horizontally away from the adapter 37. If the ram 24 is then actuated to lift the guide wheels 23, and the steering and traction wheel 16 steered to a position in the tractor axis, as shown in Figs. 2 and 3, the tractor 11 can move away from the trailer T and car C onto the platform P.

I believe that those skilled in the art will now appreciate the very considerable value of my invention. My novel tractor 11 is capable of maneuvering the trailer T in the conventional way, but is further adapted by its particular features to place the trailer T in a precise loaded position on the flat car C without the trial-and-error method that is required when utilizing a conventional tractor. Furthermore, through the utilization of my invention, the pedestal 10 and trailer T are automatically positioned relatively to one another, and, because my novel adapter 37 eliminates interference between the pedestal and lifting member on the tractor, it is an extremely simple matter to deposit the trailer upon the pedestal once the trailer is in loaded position.

I now claim:

1. In a combination of the class described, a trailer supporting pedestal having a bore for reception of a pin, a trailer provided with a vertical coupling pin, an adapter plate disposed between the trailer and pedestal and having a recess for securing the trailer coupling pin, said adapter plate including a pin movable into said pedestal bore, and a support surface on said adapter plate spaced from said pedestal when said adapter plate pin is in said pedestal bore whereby to present a space for the admission and removal of a supporting member under said support surface of said adapter plate.

2. In a combination of the class described, a pedestal having a bore for a pin, a trailer provided with a support plate and a trailer coupling pin mounted relatively to said support plate, an adapter plate disposed between the trailer and pedestal, said adapter plate including a recess for receiving the trailer coupling pin to locate the adapter plate in supporting relation to the support plate, a pin on said adapter plate adapted to enter said pedestal bore, a bearing portion on said adapter plate positioned to engage the pedestal when the adapter plate pin is in the pedestal bore, and a support surface on said adapter plate spaced from said bearing portion whereby to present a space for the admission and removal of a supporting member under said support surface of said adapter plate when said adapter plate pin is in said pedestal bore.

3. In a tractor of the class described, a traction wheel, power means for imparting tractive movement thereto, means mounting said wheel for steering rotation whereby said wheel may be positioned to drive said tractor in directions at right angles to one another, a pair of trailing wheels on said tractor for coaction with said traction wheel to support said tractor for movement, means mounting said trailing wheels for rotation on axes directionally fixed relatively to said tractor, a pair of guide wheels on said tractor rotatable on axes directionally fixed relatively to said tractor at right angles to the axes of said trailing wheels, and means for moving said guide wheels upwardly and downwardly relatively to said tractor whereby to support said tractor alternately either on said guide wheels or trailing wheels in coaction with said steering and traction wheel.

4. In a tractor of the class described, a traction wheel, power means for imparting tractive movement thereto, means mounting said wheel for steering rotation whereby said wheel may be positioned to drive said tractor in directions at sharp angles to one another, a pair of trailing wheels on said tractor rotating on predetermined axes for coaction with said traction wheel to support said tractor for movement in generally a forward and rearward direction determined by the position of said traction wheel, a pair of guide wheels on said tractor rotatable on axes directionally positioned relatively to said tractor for coaction with said traction wheel when said traction wheel is positioned to drive said tractor in a direction at a substantial angle relatively to a general forward and rearward direction, and means for effecting relative movement upwardly and downwardly between said guide wheels and said trailing wheels whereby to support said tractor alternately either on said guide wheels or trailing wheels in coaction with said steering and traction wheel.

5. In a tractor of the class described, a traction wheel, power means for imparting tractive movement thereto, means mounting said wheel for steering rotation whereby said wheel may be positioned to drive said tractor in directions at sharp angles to one another, a pair of trailing wheels on said tractor positioned for coaction with said traction wheel to support said tractor for movement, a load lifting member on said tractor manipulated to lifting position relatively to a load through movement of the tractor, a pair of guide wheels on said tractor rotatable on axes directionally fixed at sharp angles relatively to the axes of said trailing wheels, and means for effecting relative movement upwardly and downwardly between said pair of guide wheels and said pair of trailing wheels whereby to support said tractor and its lifting member alternately either on said guide wheels or trailing wheels in coaction with said steering and traction wheel.

6. In a tractor of the class described, a traction wheel, power means for imparting tractive movement thereto, means mounting said wheel for steering rotation whereby said wheel may be positioned to drive said tractor in directions at right angles to one another, a pair of trailing wheels on said tractor positioned for coaction with said traction wheel to support said tractor for movement, a pair of flanged wheels on said tractor rotatable on axes at right angles to the axes of said trailing wheels and adapted to be aligned with a track for coaction therewith, said traction wheel when positioned parallel to said track with said flanged wheels on the track driving the tractor in the direction of said track, and means for effecting relative movement in a vertical direction between said pair of flanged wheels and said pair of trailing wheels whereby to support said tractor in coaction with the traction wheel alternately either on the track through said flanged wheels or on the trailing wheels.

7. In a tractor of the class described, a traction wheel, power means for imparting tractive movement thereto, means mounting said wheel for steering rotation whereby said wheel may be positioned to drive said tractor in directions at right angles to one another, a pair of trailing wheels on said tractor positioned for coaction with said traction wheel to support said tractor for movement, guide means on the tractor adapted to enter into guide relation to a pedestal through movement of the tractor on its trailing and traction wheels, a pair of guide wheels on said tractor rotatable on axes directionally fixed at right angles relatively to the axes of said trailing wheels, means for moving said guide wheels upwardly and downwardly relatively to said tractor whereby to support said tractor alternately either on said guide wheels or trailing wheels in coaction with said steering and traction wheel, and said guide means on the tractor in guide relation to the pedestal moving the pedestal with the tractor when the tractor moves on the guide wheels and traction wheel.

8. In combination with a railroad car having longitudinal guide means, a tractor, traction means for the tractor selectively operable to effect movement of the tractor on said railroad car in directions at right angles to one another, trailing means on said tractor cooperating with said traction means for guiding said tractor in one of said directions, and means on said tractor coacting with said longitudinal guide means on said railroad car for guiding said tractor for movement in the other of said directions.

9. In combination with a railroad car having longitudinal guide means, a tractor, a single traction wheel for the tractor rotatable relatively to said tractor into driving positions at right angles to one another, two pairs of wheels cooperating alternately with said traction wheel to support said tractor for movement on said railroad car in one or the other direction, power means for rendering said pairs of wheels alternately effective to support said tractor for movement, and one of said pairs of wheels coacting with said longitudinal guide means on said railroad car for guiding said tractor for movement in one of said directions.

10. In combination with a railroad car having a longitudinal track, a tractor, a single traction wheel for the tractor rotatable relatively to said tractor into driving positions at right angles to one another, two pairs of wheels cooperating alternately with said traction wheel to support said tractor for movement on said railroad car in one or the other direction, power means for rendering said pairs of wheels alternately effective to support said tractor for movement, and one of said pairs of wheels having flanges coacting with said longitudinal track on said railroad car for guiding said tractor for movement in one of said directions.

11. In a combination of the class described, a trailer supporting pedestal having a bore for reception of a pin, a trailer provided with a support plate, and a coupling pin mounted in predetermined vertical relation to said support plate, an adapter disposed between the trailer and pedestal, said adapter including a recess for receiving said trailer coupling pin to locate the adapter in supporting relation to the trailer support plate, a pin on said adapter constructed and arranged to enter the pedestal bore, a bearing portion on said adapter positioned to engage the pedestal when the adapter pin is in the pedestal bore, a supporting member for moving into supporting relation to said adapter, interengaging means on said supporting member and adapter coacting to hold said member in spaced relation to said bearing portion of the adapter when the member supports the adapter.

12. In a combination of the class described, a trailer supporting pedestal mounted on a flat surface for movement relatively to the surface and having a mounting poriton for a trailer coupling pin, an adapter formed with a recess for receiving the trailer coupling pin, a part on said adapter adapted for coaction with said pedestal mounting portion to support the adapter on the pedestal, a tractor having a lifting member for lifting said adapter whereby to support the trailer on the adapter, said lifting member and adapter being formed to coact to hold said lifting member in spaced relation to said part of said adapter that coacts with said pedestal when the lifting member lifts the adapter, and guide surfaces on said tractor for guiding the pedestal and tractor relatively to one another whereby to place the pedestal mounting portion in position to support the adapter when the adapter is lowered on said lifting member.

References Cited in the file of this patent

UNITED STATES PATENTS

| | | |
|---|---|---|
| 1,541,457 | Winn | June 9, 1925 |
| 1,668,530 | Romine | May 1, 1928 |
| 1,734,303 | Ross | Nov. 5, 1929 |
| 1,875,052 | Ljungkull | Aug. 30, 1932 |
| 2,065,573 | Frede | Dec. 29, 1936 |
| 2,099,288 | Allen | Nov. 16, 1937 |
| 2,144,081 | Porte | Jan. 17, 1939 |
| 2,445,134 | Curell | July 13, 1948 |
| 2,637,453 | Cleveland | May 5, 1953 |
| 2,662,781 | Hopson | Dec. 15, 1953 |
| 2,783,899 | Gutridge | Mar. 5, 1957 |

FOREIGN PATENTS

| | | |
|---|---|---|
| 838,685 | France | Dec. 16, 1938 |